April 4, 1939.  A. R. BOAZ  2,153,448
APPARATUS FOR OBSERVING REVOLVING OBJECTS
Filed Aug. 30, 1935
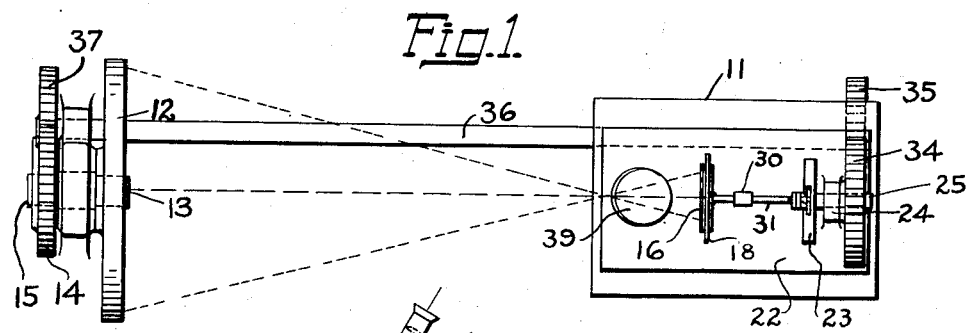
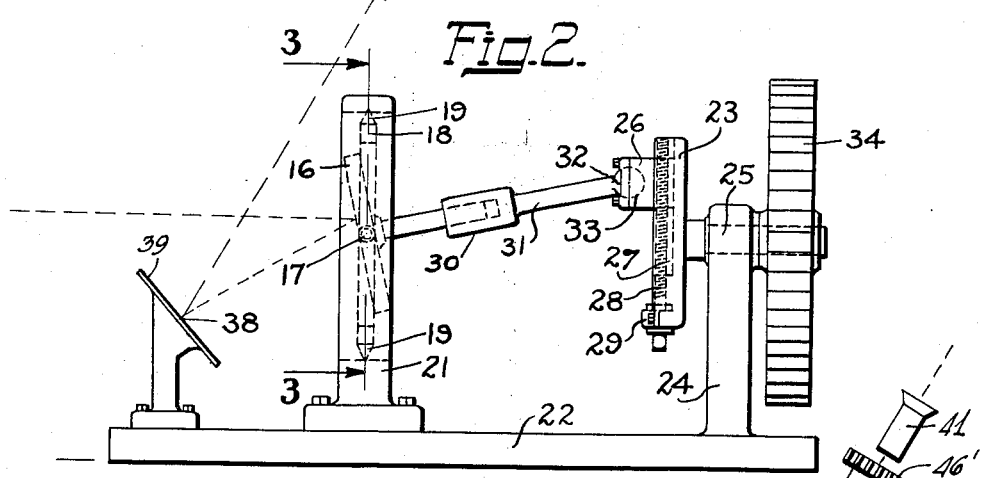
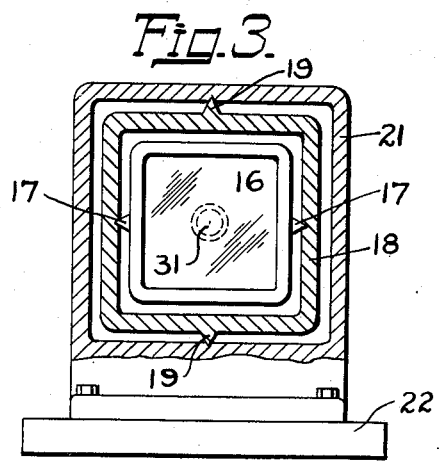
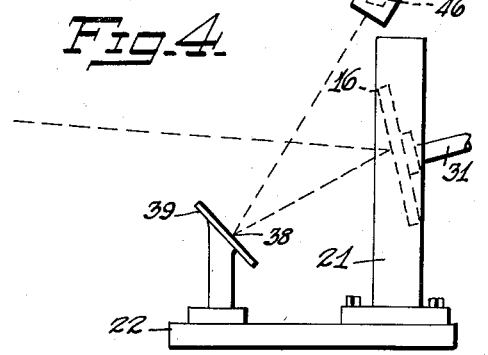
Inventor
Arthur R. Boaz
By Albert J. Norton
Attorney Patented Apr. 4, 1939

2,153,448

UNITED STATES PATENT OFFICE 2,153,448

APPARATUS FOR OBSERVING REVOLVING OBJECTS

Arthur Robert Boaz, Acton, London, England, assignor to R. Hoe & Co., Inc., New York, N. Y., a corporaton of New York Application August 30, 1935, Serial No. 38,509

6 Claims. (Cl. 88—14)

This invention relates to improvements in apparatus for observing moving objects and more particularly to such apparatus for use in observing rotating objects, wherein provision is made to cause the object viewed to appear as though it were at a fixed point.

The invention is particularly useful in observing objects or spots disposed on the face of a rotating disc or on the end face of a rotating element of a machine.

This invention broadly contemplates the provision of means, including an optical system arranged to reflect an image of a revolving object to the viewpoint of an observer, and wherein means to compensate for the movement of the object is included, to cause the image viewed to appear as at a fixed point.

The invention has for one of its principal objects, the provision of apparatus for observing a chosen spot on a rotating object, which includes means to cause the object to appear as at a fixed point, and wherein this means is given a multiple swinging movement in synchronism with the revolution of the object.

Another object of this invention is to provide in an apparatus for reducing the apparent movement of a revolving object in the image to be viewed, means to direct a reflection of the image to a position convenient to the vision of an observer.

A further object of this invention is to provide in an apparatus of this nature, mechanism to provide a multiple swinging movement for a light reflecting member, disposed to receive light rays from a revolving object, and which substantially eliminates movement from the image of the spot viewed and causes it to appear as at a fixed point.

It is also an object of this invention to provide an apparatus for observing revolving objects, of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed.

The preferred embodiment of the invention is illustrated in the accompanying drawing, wherein:

Figure 1 is a diagrammatic view showing the association of an apparatus, embodying the features of this invention, with a rotating disc upon which is an object to be viewed;

Figure 2 is a side view of the apparatus shown in Figure 1;

Figure 3 is a section of the image movement eliminating means, taken on line 3—3 of Figure 2 and looking in the direction of the arrow, and Figure 4 is a fragmental side view of another form of my invention.

As diagrammatically illustrated in Figure 1, the apparatus of this invention may be arranged within an enclosure 11, which is disposed in relation to the face of a rotating machine part, such as a rotatable disc 12, so that the said apparatus is in proper position to operate efficiently to accomplish the results desired. The object to be observed may be a chosen spot, or any object requiring periodic inspection or observance, and which, it will be assumed, is disposed upon the free face of the disc 12, at 13. The disc 12 may be rotated by any suitable means, and is herein shown as being driven by a driven gear in mesh with a gear 14, secured to a shaft 15, upon which the disc 12 is mounted.

A light reflecting member, such as a mirror 16, is mounted on trunnions 17, for swinging movement on a horizontal axis, to a frame 18, which in turn is mounted on trunnions 19, for swinging movement on a vertical axis, to a supporting bracket 21. The bracket 21 may be secured to a base 22 which may form the bottom of the enclosure 11. The above mounting of the member 16 constitutes a structure permitting its universal movement, whereby an image of a revolving object reflected thereby will be caused to appear as at a fixed point when the member is swung on the trunnions 17 and 19.

The means to cause the universal or multiple swinging movement of the member 16 upon the trunnions 17 and 19, is herein illustrated as including an adjustable crank, comprising a plate 23 rotatably supported by a standard 24, and having its shaft 25 journaled therein, and also having a radially movable block 26 slidably mounted in a radial slot 27 formed in its face. The block 26 may be moved radially upon the plate 23 by a screw 28 threadingly engaging the same and being journaled to the plate in a lug 29 formed thereon. A composite shaft 31, having separate sections operably connected by a slip joint 30 which secures the sections against relative rotation but permits relative axial movement thereof, is secured at one end to the center of the member 16 and has its other end connected to the block 26 by a ball and socket joint, herein formed by a ball 32 on the end of shaft 31, and a cooperating socket 33 in the block 26.

A gear 34 is secured to the shaft 25, whereby the plate 23 is rotated in synchronism with the disc 12, through gearing including a gear 35 in mesh with the gear 34. The gear 35 is herein shown secured to a shaft 36 which extends toward the gear 14 into position to be driven thereby through a gear 37 in mesh therewith. Due to the driving means above described, the member 16 will be moved in synchronism with the rotation of the disc 12, whereby an image of the object 13, on the disc 12, will be continuously reflected from the member 16 toward a point 38, common to all positions of the object 13, during its rotation with the disc 12. As seen at this point, the object 13 will have no translational movement, but will appear to be turning about its own center. This result will be obtained at all revolving speeds of the disc 12 due to the driving connection between the same and the member 16, whereby the object 13 and the member 16 are moved in synchronism. Variations in the radial disposition of the object 13 on disc 12 may be compensated for by radial adjustment of the block 26 on plate 23.

An image reflecting member 39 is provided, and disposed at the point 38, to reflect the image of the object 13 to a magnifying means 41, whereby an observer may view an enlarged image for close inspection thereof. If desired, a rotating prism, of a known type, as indicated at 46 in Figure 4, may be interposed between the member 39 and the lens 41 to intercept the reflected light rays, and by providing means to drive the prism at one half the speed of the disc, the apparent rotation of the observed image about its own axis, will be eliminated, thereby causing the image to appear to the observer continuously erect, as well as in a fixed position. The means to drive the prism 46 may include a gear 46' which rotates with the prism, and any preferred drive instrumentality, not shown, operably interposed between the gear 46' and any selected moving or driving component of the device.

It will be understood that the invention may be embodied in other specific forms without departing from the spirit or essential attributes thereof, and it is therefore desired that the present embodiment be considered in all respects as illustrative and not restrictive, reference being had to the claims rather than to the foregoing description to indicate the scope of the invention.

What I claim is:

1. In an apparatus for observing an object on a revolving element, a fixed light reflecting surface, an inclined reflecting surface mounted for universal movement which varies its inclination and maintains it in continuous reflecting relation with the fixed reflecting surface, means for operably connecting the revolving element and the said movable reflecting surface to impart universal movement to the said reflecting surface in synchronism with the revolving element thereby varying the inclination of the movable reflecting surface in accordance with the movement of the object on the revolving element to continuously reflect an image of the revolving object to the fixed reflecting member, the fixed reflecting member reflecting the said image to a fixed viewpoint.

2. In an apparatus for observing an object on a revolving element, an inclined reflecting surface mounted for universal movement which varies its inclination and maintains it in continuous reflecting relation to a fixed point, a crank mounted for rotation, means for operably connecting the crank with the revolving element to rotate the crank in synchronism with the revolving element, adjustable means for operably connecting the crank and the said movable reflecting surface to impart universal movement to the reflecting surface in synchronism with the revolving element thereby varying the inclination of the movable reflecting surface in accordance with the movement of the object on the revolving element to cause the said reflecting surface to continuously follow the object on the revolving element and reflect it to the fixed point.

3. In an apparatus for observing an object on a revolving element, a fixed light reflecting surface, an inclined reflecting member mounted for multiple swinging movement which varies its inclination and maintains it in continuous reflecting relation with the fixed reflecting surface, means for operably connecting the revolving element with the said swingable reflecting member to impart universal movement to the swingable reflecting member in synchronism with the revolving element thereby varying the inclination of the swingable reflecting member in accordance with the movement of the object on the revolving element to continuously reflect an image of the revolving object to the fixed reflecting surface, the fixed reflecting surface reflecting the said image to a fixed viewpoint.

4. In an apparatus for observing an object on a revolving element, an inclined light reflecting member supported independently of the revolving element and mounted for universal movement which varies its inclination and maintains it in continuous reflecting relation to a fixed point, means operably connecting the universally movable reflecting member to the revolving element to move the said reflecting member in synchronism with the revolving object thereby varying the inclination of the reflecting member in accordance with the movement of the object on the revolving element to reflect an image of the object to the fixed point, said connection including a crank mechanism adapted for adjustment to change the angle of inclination of the movable reflecting member to compensate for the radial disposition of the object being observed.

5. In a device for observing a component of an element revolving about an axis, a fixed reflecting surface, and an inclined reflecting surface mounted for universal movement about a point located in axial alinement with the axis of the revolving element, which movement varies its inclination, means for operably connecting the inclined movable reflecting surface with the revolving element to move the inclined movable reflecting surface in synchronism therewith and in predetermined relation to the fixed reflecting surface thereby varying the inclination of the inclined movable reflecting surface in accordance with the movement of the component on the revolving element to continuously reflect an image of the observed component of the revolving element to the fixed reflecting surface, the fixed reflecting surface reflecting the said image to a fixed point of observation located at one side of the axis of the revolving element.

6. In a device for observing a component of a revolving object, a fixed reflecting member, a universally movable reflecting member, members for operably connecting the universally movable reflecting member to the revolving object to operably move the universally movable reflecting member in synchronism with the revolving object and in predetermined relation to the fixed reflecting member to continuously reflect an image of the observed component of the revolving object to the fixed reflecting member, the fixed reflecting member reflecting the said image to a fixed point of observation, and means forming a component of the members for operably connecting the universally movable reflecting member with the revolving object whereby the amplitude of operable movement of the universally movable reflecting member may be varied to compensate for the radial position of the observed component of the revolving object.

ARTHUR ROBERT BOAZ.